United States Patent
Hung et al.

(10) Patent No.: US 11,544,301 B2
(45) Date of Patent: Jan. 3, 2023

(54) IDENTIFICATION METHOD WITH MULTI-TYPE INPUT AND ELECTRONIC DEVICE USING THE SAME

(71) Applicant: ASUSTeK COMPUTER INC., Taipei (TW)

(72) Inventors: Hao-Yu Hung, Taipei (TW); Chi-Lin Cheng, Taipei (TW); Yi-Chi Lai, Taipei (TW); Tsung-Lun Wu, Taipei (TW); Ying-Ru Chen, Taipei (TW); Shih-Xian Yeh, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/374,060

(22) Filed: Jul. 13, 2021

(65) Prior Publication Data

US 2022/0027393 A1    Jan. 27, 2022

(30) Foreign Application Priority Data

Jul. 24, 2020    (TW) ................................. 109125211

(51) Int. Cl.
*G06F 16/335* (2019.01)
*G06F 16/31* (2019.01)
(Continued)

(52) U.S. Cl.
CPC .......... *G06F 16/328* (2019.01); *G06F 16/313* (2019.01); *G06F 16/335* (2019.01); *G06F 16/358* (2019.01); *G06F 40/205* (2020.01)

(58) Field of Classification Search
CPC .... G06F 16/328; G06F 16/358; G06F 16/313; G06F 16/335
See application file for complete search history.

(56) References Cited

U.S. PATENT DOCUMENTS 5,832,507 A * 11/1998 Harper .................... G06F 9/454
2007/0038456 A1    2/2007 Hsu
(Continued)

FOREIGN PATENT DOCUMENTS

| CN | 106406804 A | 2/2007 |
|---|---|---|
| CN | 1918578 B | 5/2012 |

(Continued)

*Primary Examiner* — Baoquoc N To
(74) *Attorney, Agent, or Firm* — McClure, Qualey & Rodack, LLP

(57) ABSTRACT

The disclosure provides an identification method with multi-type input, which is suitable for multiple type input devices. The identification method includes: capturing a corresponding original data through the input devices, and converting the original data into a plurality of structure units correspondingly. Performing a text integration step, deconstructing a text reference element corresponding to the attributes of the structural units based on the structural units and associated elements thereof, and performing a weight evaluation and reconstruction to generate a candidate content according to the text reference element. Making a decision based on the candidate content, outputting the candidate text as a recommended content when the candidate content includes a unique candidate text, and transmitting it to a corresponding output device. An electronic device using the identification method is also provided.

23 Claims, 3 Drawing Sheets

(51) Int. Cl.
  *G06F 40/205*   (2020.01)
  *G06F 16/35*    (2019.01)

(56) References Cited

U.S. PATENT DOCUMENTS

2008/0281582 A1    11/2008   Hsu et al.
2011/0243244 A1*   10/2011   Min ..................... H04N 19/44
                                              375/240.18

FOREIGN PATENT DOCUMENTS

| CN | 103064531 B  | 4/2016  |
| CN | 106774983 A  | 5/2017  |
| TW | 200707241 A  | 2/2007  |
| TW | 200844803 A  | 11/2008 |

* cited by examiner

IDENTIFICATION METHOD WITH MULTI-TYPE INPUT AND ELECTRONIC DEVICE USING THE SAME

CROSS-REFERENCE TO RELATED APPLICATION

This application claims the priority benefit of Taiwan application serial No. 109125211, filed on Jul. 24, 2020. The entirety of the above-mentioned patent application is hereby incorporated by reference herein and made a part of specification.

BACKGROUND OF THE INVENTION

Field of the Invention

This disclosure generally relates to an input identification method and an electronic device using the same.

Description of the Related Art

Each of the existing input modes such as handwriting input, keyboard input or voice input are operated independently with low accuracy rate. The recommendation system built afterwards usually runs on the input frequency of the user, the dictionary, the cloud data, and so on. Basic sentence corrections are only performed for the currently applied input mode. The input modes cannot be used simultaneously, so it takes more time to switch between the input mode. Moreover, the recommendation system is unable to support all kinds of input modes, and is unable to effectively correct the user's error or provide appropriate suggestions.

BRIEF SUMMARY OF THE INVENTION

According to the first aspect, an identification method with multi-type input is provided herein, which is applied to a plurality of input devices. The identification method includes: capturing apondn original data through the input devices, and converting the original data into a plurality of structure units correspondingly; performing a text integration step, deconstructs a text reference element corresponding to the attributes of the structural units based on the structural units and associated elements thereof, and performing a weight evaluation and reconstruction to generate a candidate content according to the text reference element; selecting a candidate text based on the candidate content, outputting the candidate text as a recommended content when the candidate content includes a unique candidate text, and transmitting the recommended content to a corresponding output device.

According to the second aspect, an electronic device is provided herein. The electronic device includes a plurality of input devices, a processor and an output device. The input devices are configured to capture a corresponding original data. The processor is electrically connected to the input devices. The processor includes an input parsing unit, a text integration unit and a filtering and feedback unit. The input parsing unit is configured to convert the original data into the corresponding structure units. The text integration unit is deconstructed the text reference element corresponding to the attributes of the text integration unit according to the structural units and the relevant elements between them, and performs weight evaluation and reconstruction according to the text reference elements to generate a candidate content. And the filtering and feedback unit is configured to select a candidate text based on the candidate content, and output the candidate text as recommended content when the candidate content includes a unique candidate text. And the output device is electrically connect to the processor, to output the recommended content.

Based on the above, the disclosure corrects and recommends through different input contents, so as to solve the reference limitation, word selecting efficiency and word selecting correctness of the automatic correction of the single input mode, while effectively improving the user's input efficiency and accuracy.

DETAILED DESCRIPTION OF THE EMBODIMENTS

Figure 1:
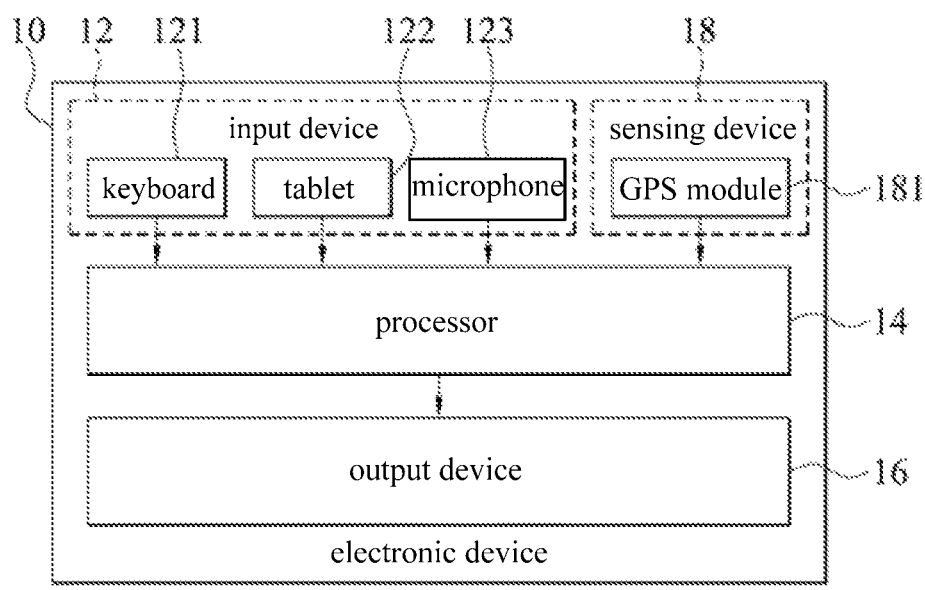
FIG. 1 is a block diagram of an electronic device according to an embodiment.

FIG. 1 is a block diagram of an electronic device according to an embodiment. Please refer to FIG. 1, an electronic device 10 includes a plurality of input devices 12, a processor 14 and an output device 16. In an embodiment, the input devices 12 configure to receive an original data such as text data, voice data or handwriting data. The processor 14 is electrically connected to the input device 12 and the output device 16. In an embodiment, the processor 14 includes a software framework for processing multi-type input content translation. The processor 14 analyzes the corresponding spelling relationship between the original data of the input and the target content and execute the translation and parsing process according to the original data to generate the recommended content and transmit it to the output device 16, so that the output device 16 outputs the recommended content to the users. The electronic device 10 further includes a sensing device 18, which is electrically connected to the processor 14, to provide a sensing signal to the processor 14, so as to assist the processor 14 to provide more correct candidate contents.

In one embodiment, the electronic device 10 is a notebook, a mobile phone, a personal digital assistant (PDA), a tablet computer, a navigation device or a car machine, which is not limited herein. In one embodiment, the input device 12 is a keyboard such as a physical keyboard or a virtual keyboard, a writing pad, a touchpad, a touch screen, or any input module that supports writing input, or a microphone, which is not limited herein. In one embodiment, the sensing device 18 is any device that senses the environment or provides input information, such as a global positioning system (GPS) module (hereinafter referred to as a GPS module). In one embodiment, the output device 16 is a display device or a voice output device, and when the handwriting function and the display device are integrated as a touch screen, the touch screen is used as the input device 12 and the output device 16 at the same time.

In one embodiment, as shown in FIG. 1, the electronic device 10 uses a keyboard 121, a writing pad 122, and a microphone 123 as the input device 12. The processor 14 is electrically connected to the keyboard 121, the writing pad 122, and the microphone 123. The electronic device 10 uses a GPS module 181 as the sensing device 18, and the processor 14 is electrically connected to the GPS module 181. The software architecture in the processor 14 is further shown in FIG. 2. The processor 14 includes an input parsing unit 20, a text integration unit 22, and a filtering and feedback unit 24. The text integration unit 22 is connected to the input parsing unit 20 and the filtering and feedback unit 24, and the text integration unit 22 further includes a deconstruction unit 221 and a reconstruction unit 222. The deconstruction unit 221 is signal connected to the input parsing unit 20 and the reconstruction unit 222, and the reconstruction unit 222 is connected to the filtering and feedback unit 24.

Figure 2:
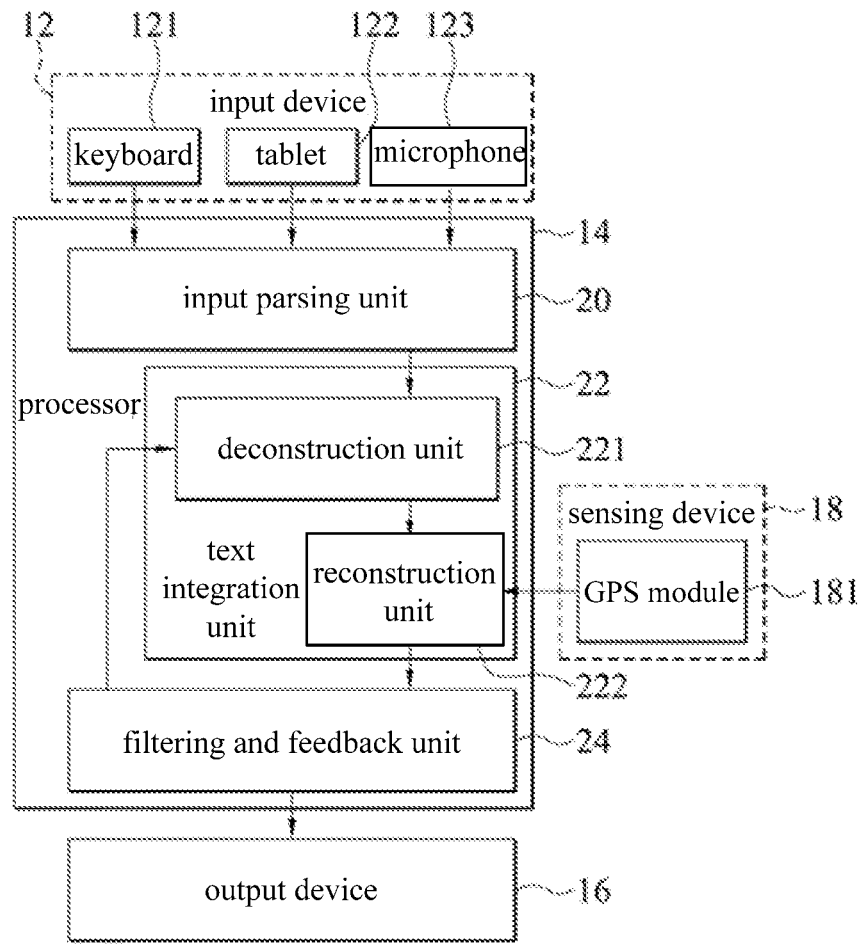
FIG. 2 is a schematic diagram of a system architecture of the electronic device according to an embodiment.
Figure 3:
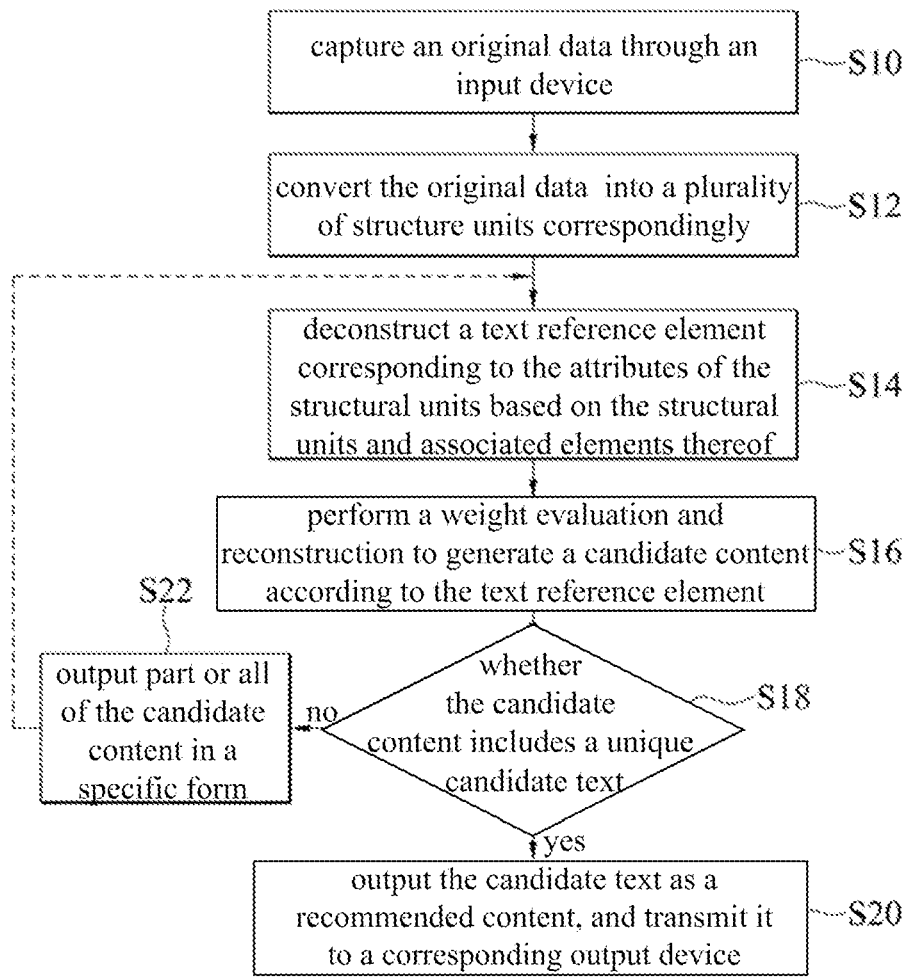
FIG. 3 is a flowchart of an identification method according to an embodiment.

FIG. 3 is a flowchart of an identification method according to an embodiment. Please refer to FIG. 2 and FIG. 3. The identification method with multi-type input is suitable for a plurality of input devices 12 with the keyboard 121, the writing pad 122, and the microphone 123. As shown in step S10, the corresponding original data is captured through the input devices 12, that is, the corresponding text data is captured through the keyboard 121, the corresponding handwriting data is captured through the writing pad 122, and the voice data is captured through the microphone 123. In one embodiment, the original data includes at least two of a text data, a voice data, or a handwriting data.

In an embodiment, the identification method is applied with a sensing device 18 (including a GPS module 181) to capture a corresponding sensing data through the sensing device 18. In an embodiment, the GPS module 181 captures the sensor data with a location information. At this time, due to the sensor data, the original data only needs to include at least one of the text data, the voice data, or the handwriting data, which is not limited herein.

As shown in step S12, after obtaining the original data, the original data is transmitted to the input parsing unit 20 in the processor 14, and the input parsing unit 20 converts the original data into a plurality of structure units correspondingly, in order to translate the original data of different input devices 12 into the structure units in a unified format. Wherein the input parsing unit 20 analysis and integrates correlations of the original data from different input devices 12, and the correlations are used as the relevant elements of words and characters, so the structure units and the relevant elements between the structure units are generated.

The structure units generated by the input parsing unit 20 is transmitted to the text integration unit 22 for processing a text integration step, and the text integration step includes step S14 and step S16. As shown in step S14, the deconstruction unit 221 in the text integration unit 22 deconstructs one or more text reference elements corresponding to the attributes of the structure units based on the structure units and the relevant elements between them. In one embodiment, the deconstruction unit 221 uses at least one of the disassembly modes such as regular disassembly, character disassembly, or approximate disassembly for deconstruction, to generate the text reference elements. For example, regarding to rule disassembly, it includes the upper left, upper right, lower left and lower right of Korean, which are defined based on the specific locations, initials, prenuclear glides, finals and tones of Zhuyin, and prefixes, suffixes and phrases of English; regarding to character disassembly, the upper left, upper right, lower left and lower right of Korean, the elements disassembly of Chinese (for example, the Chinese character "贏" is disassembled into "亡口月貝凡", and the Chinese character "贏" is disassembled into "亡凵月女凡"), the prefixes, suffixes and fragments of English; regarding to approximate disassembly, retroflex and non-retroflex of Zhuyin, the regional accent, and the strokes of similar characters (such as: "丿" and "丨", "礻" and "衤"). Wherein there is no absolute limit to the source of the disassembly modes and the language thereof or the input devices 12. The same language is combined with source of the input device 12 and multiple disassembly modes in some embodiments, that is, the language, the input source and the disassembly mode is combined arbitrarily, and the combination method is not limited to single or combined use.

The text reference elements generated by the deconstruction unit 221 is transmitted to the reconstruction unit 222. As shown in step S16, the reconstruction unit 222 performs a weight evaluation and a reconstruction process according to the text reference elements to generate a candidate content. The candidate content includes one or more candidate texts in some embodiments. In one embodiment, when the processor 14 receives the sensing data from the sensing device 18, the reconstruction unit 222 simultaneously generates the corresponding candidate content based on the text reference elements and the sensing data.

In an embodiment, the relevant elements include relevancies of specific characters, sounds, and meanings of the structure units, or include the correlations among the structure units from the different input devices 12, such as similar or related types of prefixes, suffixes, phrases, radicals, similar sounds, translations, strokes, and any contextual associations that helps to provide sufficient information for the input content. In one embodiment, the more the relevant elements of the structure units, the higher the weight of the text reference elements.

As shown in step S18, the filtering and feedback unit 24 select a candidate text based on the candidate content, to determine whether there is a unique candidate text in the candidate content. When the candidate content includes a unique candidate text, as shown in step S20, the filtering and feedback unit 24 outputs the candidate text as the recommended content and transmits the candidate text to the corresponding output device 16, so that the output device 16 outputs the recommended content to feedback to the users. When the candidate content does not include the unique candidate text (there are multiple candidate texts at the same time in some embodiment), as shown in step S22, the filtering and feedback unit 24 outputs part or all of the candidate content in a specific form. In one embodiment, the filtering and feedback unit 24 outputs part or all of the candidate content in a specific form such as a recommendation table, a temporary storage area, anti-gray words, and the recommended word. When the candidate content does not include any matching candidate text, return to the text integration step (such as step S14 and step S16), the filtering and feedback unit 24 outputs part or all of the candidate content and feedback to the text integration unit 22, to perform the next round of the text integration step (deconstruction and reconstruction).

Please refer to FIG. 2 and FIG. 3. In an embodiment, the reconstruction unit 222 evaluates the weight of each of the text reference elements according to the similarity after deconstruction. For example, when the user's target content is an English word "simultaneously", the user inputs "sinultan" through the keyboard 121 and says "simultaneous (voice)" through the microphone 123, the input parsing unit 20 obtains the corresponding structure units respectively according to the original data of the text input of the keyboard 121 and the voice input of the microphone 123, which is "sinultan" and "simultaneity (written words)". Then, the deconstruction unit 221 deconstructs the word "sinultan" to be used as the text reference elements for reconstruction. Therefore, the deconstruction unit 221 is disassembled into "sinu ltan" (two text reference elements), "sin ultan" (two text reference elements), "si n ultan" (three text reference elements), and so on. After that, the reconstruction unit 222 gives a higher weight to the "si n ultan" in the disassembly mode, and the "si n ultan" is the most similar with the reference elements deconstructed from "simultaneously". Therefore, the reconstruction unit 222 corrects the result into "simultaneously" and outputs it as the candidate text in the candidate content. Since "simultaneously" is the unique candidate text, the filtering and feedback unit 24 directly transmits the candidate text as the recommended content to the output device 16 for output, to recommend the correct and complete English word "simultaneously" to the user. Therefore, different input contents (some English letters input by the keyboard 121 and voice input by the microphone 123) are corrected, and the correct words are recommended to the user.

While inputting Chinese words, the filtering and feedback unit 24 described above uses a specific form to output partially or all characters of the candidate Chinese word. In the embodiment where a user's target content is a Chinese term "彰化" (which pronounce "zhang-hua") combining with two Chinese words "彰" (which pronounce "zhang") and "化" (which pronounce "hua"). The term is input by voice from the microphone 123 and the handwriting input in the writing pad 122. For the voice input, it should be recognized to be "彰化" (which pronounce "zhang-hua"), however, "髒話" (which pronounces "Zang-Hua") is sometimes wrongly recognized in some embodiments. Considering the handwriting input, the user writes down the character "立" for part of the word "彰", and the character "匕" for part of the word "化" through the writing pad 122. Meanwhile, based on the phonetic "ㄓㄤ" (pronounced "zhang"), the combination of similar sounds in Mandarin phonetic symbols system such as "ㄗ" (pronounced "zi"), ㄘ (pronounced "ci"), "ㄔ" (pronounced "chi"), "ㄤ" (pronounced "ang"), "ㄢ" (pronounced "an") does not simultaneously conform to any combination of the characters "立" and "匕". Therefore, the filtering and feedback unit 24 outputs the character "匕" in a specific form, and stores it in the temporary storage area through the filtering and feedback unit 24 and feeds it back to the next round of text integration step. The word "彰" (pronounced "zhang") is partially output in a specific form, but the data is not enough to determine a set of the most correct results in some embodiment. All the key elements are obtained in the next round of the text integration step such as the character "立" of "彰" and "ㄓㄤ" (pronounced "zhang"), "匕" and "ㄏㄨㄚ" (pronounced "hua"), and "ㄓㄤ, ㄏㄨㄚ" (pronounced "zhang-hua"). Therefore, the text integration unit 22 generates "彰化" (pronounced "zhang-hua") as a unique candidate text in the candidate content, so the filtering and feedback unit 24 directly transmits the candidate text as the recommended content to the output device 16 for output, so as to recommend the most correct target word "彰化" (pronounced "zhang-hua") to the user.

In another embodiment, when the user's target content is a Chinese term "異域" (pronounced "yi-yu"), the user uses the voice input via the microphone 123 and the handwriting input via the writing pad 122. The similar sounds but different meanings of the Chinese terms include "意欲", "抑鬱" and "異域", and so on. As "異域" is a relatively unpopular term, the traditional recommendation system within single input method (via voice) will first recommend "意欲" or "抑鬱". In contrast, in an embodiment, where a user writes down "田" (that is the character of word "異") on the writing pad 122, and inputs the word "異域" (pronounced "yi-yu") through the microphone 123. In the result of the first round of deconstruction and reconstruction in the text integration unit 22, the deconstruction unit 221 deconstructs the words including the element of pronouncing "ㄧˋ" (pronounced "yi" with the fourth tonal) within the character "田" (the character of the Chinese word "異") are "異" and "翼", and outputs part of the result for the second round of the text integration step. When entering the second round of the text integration step, the text integration unit 22 outputs "異域" as the unique candidate text in the candidate content, so that the filtering and feedback unit 24 is able to directly output "異域" to the output device 16, which accurately defines the target content of "異域".

Still in the embodiment, the user uses the voice input of the microphone 123 and the handwriting input of the writing pad 122 a Chinese term "異域" (pronounced "yi-yu"). The user writes down "土" (the character of the Chinese word "域") through the writing pad 122, and inputs voice "異域" (pronounced "yi-yu") through the microphone 123. In the results of the first round of deconstruction and reconstruction in the text integration unit 22, because the character "土" (that is a character of the Chinese word "域") cannot match a reference word pronouncing the sound "ㄧˋ" (pronounced "yi", in other words, no matching candidate text with the pronunciation), the filtering and feedback unit 24 feeds back the word "ㄧˋ" (pronounced "yi") to the second round of the text integration step, for the text integration unit 22 analyzes "ㄧˋ ㄩˋ" (pronounced "yi-yu") and finds the word that matches "土" at the same time. The text integration unit 22 then outputs "異域" as the unique candidate text in the candidate content, so that the filtering and feedback unit 24 directly outputs the word "異域" to the output device 16, and the target content "異域" is accurately recommended.

In another embodiment, when the user's target content is the Chinese sentence "我在佳里" (pronounced "wo-zai-cha-li", means "I'm in location—Cha-Li), the user uses the voice input of the microphone 123 and the sensing data of the GPS position information of the GPS module 181. When users simply pronounce the four words by the voice input, it is recognized as "我在佳里" (pronounced "wo-zai-jia-li", means "I'm in Jiali District) or "我在家裡" (also pronounced "wo-zai-jia-li" in Chinese, but means "I'm at home") in some embodiments (the four words in Chinese all pronounce "wo-zai-cha-li" but within different meanings). Meanwhile, the reconstruction unit 222 in the text integration unit 22 obtains the user's location in "台南佳里" (Jiali District at southern Taiwan) based on the actual GPS location information (the sensing data). Therefore, the reconstruction unit 222 selects "我在佳里" as the preferred candidate content based on the GPS location information, and the text integration unit 22 outputs "我在佳里" as the unique candidate text in the candidate content, so that the filtering and feedback unit 24 directly outputs "我在佳里" as the recommended content to the output device 16.

Based on above, the advantage of the disclosure is to provide the users with voice input in a certain situations that are not good for long wordings input (for example, with privacy considerations or noisy open environment), and to make effective recommendations for the users whose input content is only segmented cognition of form, sound and meaning (for example, forgetting how to spell words or misspelling words), and to provide a high accuracy for a single input experience. Moreover, through the method of the disclosure, users can obtain a specific result through the amount of data from various input sources and cooperate with the relevant elements to achieve the recommendation of the best candidate content. At the same time, the speed and accuracy of more complex (such as strokes) or longer text typing are also effectively improved. In addition, within the sensing device in the disclosure, the accuracy of identification is increased, so as to provide the users with more accurate candidate content according to the sensing data. Furthermore, in the disclosure, a large amount of text is also selectively cooperates with to improve the recognition rate, which is not limited herein.

Based on the above, the multi-type input identification method disclosed in the disclosure corrects and recommends through the different input contents, so as to solve the defects of reference limitation, low efficiency and accuracy of automatic correction of the single input mode, and effectively improves the input efficiency and accuracy of the users.

The above-mentioned embodiments are only to illustrate the technical ideas and features of the case, and their purpose is to enable those who are familiar with the technology to understand the content of the case and implement them accordingly. If they cannot be used to limit the scope of the patent in this case, that is, according to the case. Equal changes or modifications made to the spirit of the disclosure should still be included in the scope of the patent application in this case.

What is claimed is:

1. An identification method with multi-type input, applied to a plurality of input devices, comprising:
   capturing an original data through the input devices, and converting the original data into a plurality of structure units correspondingly;
   performing a text integration step, including deconstructing a text reference element corresponding to the attributes of the structural units based on the structural units and associated elements thereof, and performing a weight evaluation and reconstruction to generate a candidate content according to the text reference element; and
   selecting a candidate text based on the candidate content, wherein outputting the candidate text as a recommended content when the candidate content includes a unique candidate text, and transmitting the recommended content to a corresponding output device.

2. The identification method with multi-type input according to claim 1, further comprising the step of:
   outputting part or all of the candidate content in a specific form when the candidate content does not include the unique candidate text.

3. The identification method with multi-type input according to claim 2, wherein in the step of outputting part or all of the candidate content in the specific form further comprising:
   outputting the part or all of the candidate content in a form of recommendation table, temporary storage area, anti-gray words, and the recommended word.

4. The identification method with multi-type input according to claim 2, wherein when the candidate content does not include any matching candidate text, return to the text integration step, and output part or all of the candidate content to feedback to next round of the text integration step.

5. The identification method with multi-type input according to claim 1, wherein the original data includes at least two of a text data, an audio data, or a handwriting data.

6. The identification method with multi-type input according to claim 1, further comprising: capturing a sensing data through a sensing device to generate the candidate content based on the text reference element and the sensing data.

7. The identification method with multi-type input according to claim 6, wherein the original data includes at least one of a text data, an audio data, or a handwriting data.

8. The identification method with multi-type input according to claim 1, wherein the relevant elements include relevancies of a specific character, a sound and a meaning of the structural units.

9. The identification method with multi-type input according to claim 1, wherein the relevant elements include the correlation between the structural units of the different input devices.

10. The identification method with multi-type input according to claim 1, wherein the more the relevant elements of the structural units, the higher the weight of the corresponding text reference elements.

11. The identification method with multi-type input according to claim 1, wherein the text reference element is generated by deconstruction using at least one of a regular disassembly, a character disassembly and an approximate disassembly.

12. An electronic device, comprising:
    a plurality of input devices, configured to capture a corresponding original data;
    a processor, electrically connected to the input devices, the processor performs:
    converting the original data into a plurality of structure units correspondingly;
    deconstructing the text reference elements corresponding to the attributes of the structure units according to the structural units and the relevant elements there between, and performing weight evaluation and reconstruction according to the text reference elements to generate a candidate content; and
    selecting a candidate text based on the candidate content, and outputting the candidate text as recommended content when the candidate content includes a unique candidate text; and
    an output device, electrically connect to the processor, to output the recommended content.

13. The electronic device according to claim 12, wherein the processor outputs part or all of the candidate content in a specific form when the candidate content does not include unique candidate text.

14. The electronic device according to claim 13, wherein when the processor outputs the part or all of the candidate content in the specific form, the part or all of the candidate content is output in a form of recommendation table, temporary storage area, anti-gray words, and the recommended word.

15. The electronic device according to claim 13, wherein the processor outputs part or all of the candidate content and feeds back to the text integration unit when the candidate content does not include any matching candidate text, so as to perform next round of the deconstruction and reconstruction.

16. The electronic device according to claim 12, wherein the original data includes at least two data among a text data, an audio data, or a handwriting data.

17. The electronic device according to claim 12, wherein the relevant elements include relevancies of the specific character, sound, and meaning of the structure units.

18. The electronic device according to claim 12, wherein the relevant elements include the correlation between the structure units of the different input devices.

19. The electronic device according to claim 12, wherein the more the relevant elements of the structure units, the higher the weight of the text reference elements.

20. The electronic device according to claim 12, wherein the processor performs:
   deconstructing the text reference elements corresponding to the attributes of the structure units according to the structure units and the relevant elements; and
   performing a weight evaluation and a reconstruction according to the text reference elements to generate the candidate content.

21. The electronic device according to claim 20, further comprises a sensing device, electrically connected to the processor to capture a sensing data, so that the processor generates the candidate content according to the text reference elements and the sensing data.

22. The electronic device according to claim 21, wherein the original data includes at least one of a text data, an audio data, or a handwriting data.

23. The electronic device according to claim 20, wherein the processor uses at least one of a regular disassembly, a character disassembly and an approximate disassembly for deconstruction, to generate the text reference elements.

* * * * *